US011909865B2

(12) United States Patent
Li et al.

(10) Patent No.: US 11,909,865 B2
(45) Date of Patent: Feb. 20, 2024

(54) METHOD AND DEVICE FOR SECURING A COMMUNICATION PATH

(71) Applicant: LENOVO (SINGAPORE) PTE. LTD, New Tech Park (SG)

(72) Inventors: Scott Li, Cary, NC (US); Igor Stolbikov, Apex, NC (US); Rod D. Waltermann, Rougemont, NC (US); Joshua N. Novak, Forest, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 295 days.

(21) Appl. No.: 17/456,032

(22) Filed: Nov. 22, 2021

(65) Prior Publication Data

US 2023/0163954 A1  May 25, 2023

(51) Int. Cl.
*H04L 9/08* (2006.01)
*G06F 21/85* (2013.01)
*H04L 9/32* (2006.01)

(52) U.S. Cl.
CPC ............ *H04L 9/0825* (2013.01); *G06F 21/85* (2013.01); *H04L 9/0861* (2013.01); *H04L 9/0894* (2013.01); *H04L 9/3242* (2013.01)

(58) Field of Classification Search
CPC ..................................................... H04L 9/0825
See application file for complete search history.

(56) References Cited

U.S. PATENT DOCUMENTS

| 6,065,008 A | * | 5/2000 | Simon | G06F 21/10 707/999.009 |
| 2015/0333904 A1 | * | 11/2015 | Udupi | H04L 9/0844 380/278 |
| 2019/0020632 A1 | * | 1/2019 | Leavy | H04L 9/14 |
| 2022/0094530 A1 | * | 3/2022 | Sreeravindra | H04L 9/0861 |
| 2023/0163954 A1 | * | 5/2023 | Li | H04L 9/3242 713/171 |

* cited by examiner

*Primary Examiner* — Ponnoreay Pich
(74) *Attorney, Agent, or Firm* — Dean D. Small; The Small Patent Law Group, LLC (57) ABSTRACT

An electronic device is provided that includes a memory storing program instructions, and one or more processors. The one or more processors, when executing the program instructions, are configured to generate an agent public key, and generate a key font based on the agent public key. The one or more processors are also configured to communicate the key font to an operating system, and obtain a key message based on the key font from an application. The one or more processors are also configured to respond to the key message on a bus based on the key message.

20 Claims, 5 Drawing Sheets

METHOD AND DEVICE FOR SECURING A COMMUNICATION PATH

BACKGROUND

Embodiments herein generally relate to methods and systems for securing a communication path over a mesh network.

Web based applications such as a progressive web application (PWA) operate inside a browser, and is sandboxed, or run separately, from the rest of an operating system (OS). Typically, the PWA is sandboxed to provide additional privacy and security for the OS. However, some web based applications require deep integration with hardware of the OS. To achieve this deep integration with the hardware, typically local host, Web Sockets™, other programs, or the like, are utilized to supply the integration between the operating system and the PWA. Unfortunately, the local hosts, Web Sockets™, other programs, or the like, still have security holes that can be compromised by malware that is utilized by hackers, bad actors, etc. Thus, a need exists for securing a communication pathway between PWA and hardware to provide the desired deep integration without between the PWA and hardware without the current security risks resulting from the communication.

SUMMARY

In accordance with embodiments herein, an electronic device is provided that includes a memory storing program instructions, and one or more processors. The one or more processors, when executing the program instructions, are configured to generate an agent public key, and generate a key font based on the agent public key. The one or more processors are also configured to communicate the key font to an operating system, and obtain a key message based on the key font from an application. The one or more processors are also configured to respond to the key message on a bus based on the key message.

Optionally, the one or more processors are also configured to generate an updated agent public key after a determined period, and generate an updated key font based on the updated public key. The one or more processors are also configured to obtain an updated key message based on the updated key font from the application, and respond to the updated key message on the bus based on the updated key message. In one aspect, the one or more processors are also configured to uninstall the key font in response to responding to the key message on the bus. In another aspect, the application is a progressive web application. In one example, the bus is a message queuing telemetry transport (MQTT) bus.

Optionally, the electronic device also includes the application, and the application is configured to receive the key font from the operating system. The application can also be configured to generate the key message, and communicate the key message over the bus. In one example, to generate the key message includes encrypting the key message based on the agent public key and an application public key. In one aspect, the system may also include the operating system. The operating system is configured to receive the key font and communicate the key font to the application.

In accordance with embodiments herein, a computer implemented method is provided for providing a secure communication path under control of one or more processors including program instructions to generate an agent public key. The instructions also to generate a key font based on the agent public key, and communicate the key font to an operating system. The program instructions also to obtain a key message based on the key font from an application, and respond to the key message on a bus based on the key message.

Optionally, the one or more processors also including program instructions to generate an updated agent public key after a determined period, and to generate an updated key font based on the updated public key. The instructions also to obtain an updated key message based on the updated key font from the application, and to respond to the updated key message on the bus based on the updated key message. These steps can be repeated accordingly. In one aspect, the one or more processors also include program instructions to uninstall the key font in response to responding to the key message on the bus. In another aspect, the application is a progressive web application. In one example, the bus is a message queuing telemetry transport (MQTT) bus.

In accordance with embodiment herein, an electronic device is provided that includes a memory storing program instructions, and one or more processors. The one or more processors when executing the program instructions, are configured to generate a first key font based on a first agent public key. The electronic device also includes an operating system configured to receive the first key font and communicate the first key font to an application. The one or more processors are also configured to obtain a first key message based on the first key font from the application, and respond to the first key message on a bus based on the first key message.

Optionally, the application is a progressive web application. In one aspect, the bus is a message queuing telemetry transport (MQTT) bus. In another aspect, the one or more processors are also configured to uninstall the key font in response to responding to the key message on the bus. In one example, the electronic device also includes the application. The application can be configured to receive the key font from the operating system, and generate the key message based on the key font. The application can also be configured to communicate the key message over the bus. In another example, to generate the key message includes encrypting the key message based on the agent public key and an application public key. In one embodiment, the one or more processors are also configured to in response to a determined period lapsing after generating the first agent public key, generate a second agent public key. The one or more processors can also be configured to generate a second key font based on the second agent public key. The operating system can also be configured to receive the second key font and communicate the second key font to an application. The one or more processors can also be configured to obtain a second key message based on the second key font from the application, and respond to the second key message on the bus based on the second key message.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "agent" as used herein refers to a program, circuitry, software, hardware, etc. that includes instructions that may be executed or performed by one or more processors. An agent may include instructions for security protocols, generating keys such as agent public keys, communicating data and information, obtaining data and information, analyzing data and information, making determinations, encrypting communications, or the like. In one example, an agent may include instructions for generating a key font based on an agent public key and installing a font file that includes the key font into an operating system of an electronic device. The agent may also include instructions for receiving key messages from an application, and responding to such a key message along a bus.

The term "application" as used herein refers to a computer software program that includes instructions that may be performed by one or more processors to provide a desired function related to the application. The application communicates with the operating system, one or more processors, agents, other programs, memories, operator through an input device or interface, other electronic devices, or the like to obtain data and information and provide a desired function. The application may be a game, health monitor, delivery service, communications service, security service, etc. that can be installed, downloaded, uploaded, or the like onto an electronic device. In one example, the application may be a progressive web application (PWA) that is software received over the internet of things (IoT) (e.g. the web), including through HTML, JavaScript, or other computing langue. In this manner, the PWA may be installed on and utilized on a desktop, mobile device, or the like.

The term "bus" as used herein refers to any and all hardware and software that transfers data in between components of the electronic device, or between component of the electronic device with different electronic devices. The hardware components may be wire, optical fiber, etc. while software components may encompass communication protocols, including for wireless communications, cellular communication, Wi-Fi communication, over the air communications, or the like. In one example, the bus may be a message queuing telemetry transport (MQTT) bus. In particular, a MQTT bus is a low bandwidth, high latency protocol, or pathway.

The term "key" as used herein, refers to a context of data structures used to identify and retrieve data, including cryptograph data. In examples, a key can be a unique identifier, value including integers, letters, etc., hash function, converted into a hash code, word, name, or the like. A key can be utilized to retrieve a shared secret. A key is considered a public key when the key is communicated over an unsecure network or pathway. The key may be an agent public key, application public key, a shared public key, or the like. In one example, an agent public key is inputted into an electronic device by a user.

The term "key font" as used herein, refers to any and all keys that are placed, provided, installed, or otherwise in a list of fonts, such as a font file. The key font may include numbers, letters, hash functions, passwords, passcodes, combinations thereof, or the like. The key font in one example may be included in a list of fonts that include Times New Roman, Arial, Century Schoolbook, Calibri, Calibri light, or the like. In one example, the key font can be installed, provided to, etc. to an operating system from an agent.

The term "key message" as used herein, refers to any and all messages communicated between components of an electronic device that is formed based on an agent public key. The agent public key is a key generated by an agent and in one example may be formed into a key font. The key font may then be utilized to extract information, data, etc. and to generate the key message. The key message can be encrypted, include the agent public key, or the like. In one example the key message is communicated from an operating system to an agent that generated the agent public key.

The term "obtain" or "obtaining", as used herein in connection with data, including cryptographic data, key data, signals, information and the like, includes at least one of i) accessing memory of a local external device or resource manager where the data, signals, information, etc. are stored, ii) receiving the data, signals, information, etc. over a wireless communications link between the client device and a local external device, and/or iii) receiving the data, signals, information, etc. at a resource manager over a network connection. The obtaining operation, when from the perspective of a client device, may include sensing new signals in real time, and/or accessing memory to read stored data, signals, information, etc. from memory within the client device. The obtaining operation, when from the perspective of a local external device, includes receiving the data, signals, information, etc. at a transceiver of the local external device where the data, signals, information, etc. are transmitted from a client device and/or a resource manager. The obtaining operation may be from the perspective of a resource manager, such as when receiving the data, signals, information, etc. at a network interface from a local external device and/or directly from a client device. The resource manager may also obtain the data, signals, information, etc.

from local memory and/or from other memory, such as within a cloud storage environment and/or from the memory of a workstation.

The term "operating system" as used herein refers to computer software that interfaces with computer hardware for implementing or performing instructions. An operating system may provide a communication pathway or bus for circuitry to communicate data and information between an agent of an electronic device and an application that has been installed or communicates with an electronic device.

The phrase "shared key" as used herein refers to any key, including an agent public key, an application key, or the like provided from two different devices or components that are the same. The shared key may include a shared secret that may be only known as a result of cryptography, use of security protocols including utilizing an elliptic curve Diffie-Hellman (ECDH) algorithm, hash function, keys, passwords, passcodes, or the like.

System Overview

Provided is a system for providing a secure communication pathway between an agent and application along a bus. An agent public key is provided to the agent that is configured to generate a key font that is installed into an operating system. The application can then receive the key font from the operating system and extract data and information related to the agent accordingly. From the key font, the application can encrypt a key message that is based on the key font that is communicated along the bus to the agent. The agent recognizes the key message, and as are result responds to the key message over the bus to provide the secure communication pathway. Thus provided is a secure-one-way communication that initiates communication between the application and the electronic device over the same bus as the rest of the network is utilizing. The agent can generate a PKI key pair, for example every day, until it is paired with an application key via the utilization of a key font.

Figure 1:
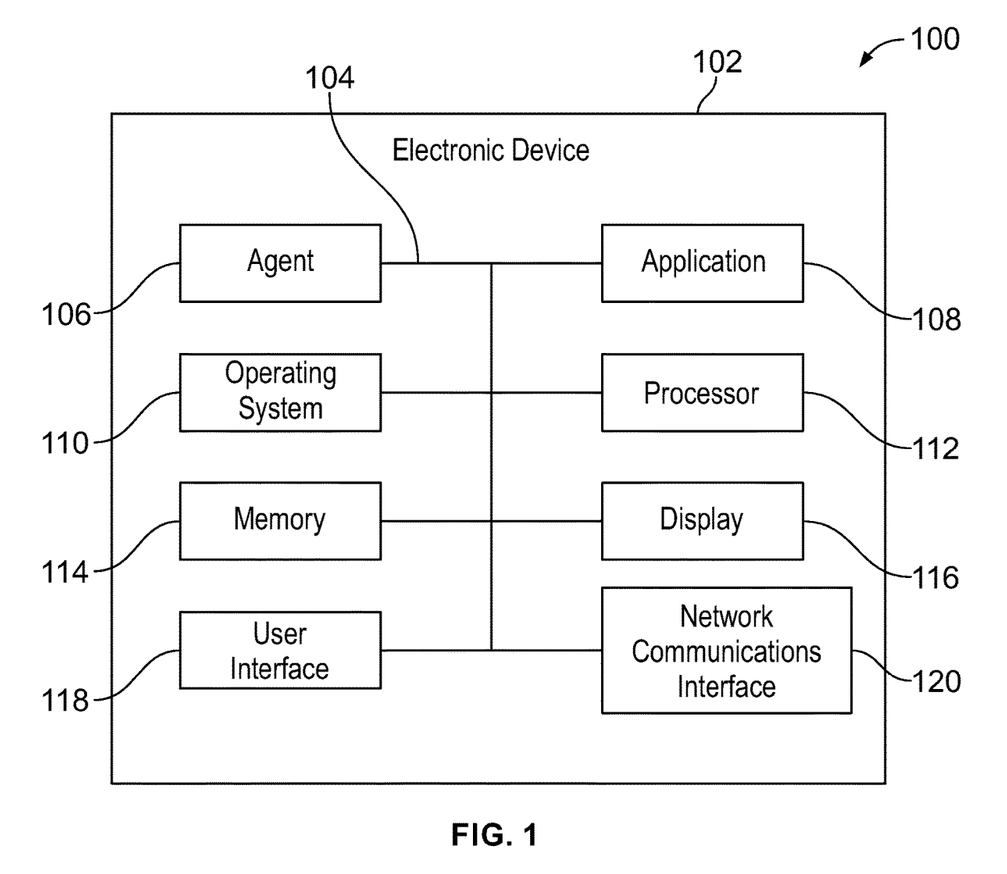
FIG. 1 illustrates a system to secure a communication pathway in accordance with embodiments herein.

FIG. 1 illustrates a system 100 for an electronic device 102 implemented in accordance with embodiments herein for providing a secure communication pathway, or bus 104 between an agent 106 and an application 108 utilizing an operating system 110. The electronic device 100 may represent various types of electronic devices including, but not limited to, personal computers, tablet devices, laptop computers, embedded appliances (e.g., thermostats, home monitoring systems, and the like), smart watches, vehicles, digital assistants, and an entire array of other smart consumer goods. The electronic device can also include one or more processors 112, memory 114, a display 116, a user interface 118, a network communications interface 120, and various other mechanical components, electrical circuits, hardware and software to support operation of the electronic device.

The bus 104 may be a software, hardware, a combination of hardware and software, or the like that provides a communication pathway. The bus 104 may include a wire, be wireless, be over the air, cellular, Wi-Fi, or the like. In one example the bus 104 is a MQTT bus that provides a communication pathway between the agent 106 and the application. Still, in other examples, other buses with varying bandwidth and latency may be provided.

The agent 106 may be software, hardware, circuitry, or the like that provides instructions for a processor 112 to execute. In one example, the agent 106 is a security program that provides access to the memory 114, files, data, etc. associated with a user's desktop, hard drive, or the like. In one example, the agent 106 may receive a public key and repeatedly generates an agent public key for a determined period. The public key may have public key infrastructure (PKI), and is considered public because the public key may be received over an unsecure public network. The agent public key generated by the processor 112 based on the instructions of the agent can be unique identifier, value including integers, letters, etc., hash function, converted into a hash code, word, name, or the like, that is associated with the public key. The determined period may be an hour, twelve hours, a day, two days, etc. In particular, if the determined period is a day, then the processor generates a first agent public key based on the public key, and after twenty-four hours, a second agent public key is generated based on the public key. This can then be repeated every twenty-four hours such that a third, fourth, fifth, etc. agent public keys are generated with each generated key being randomly generated with no dependence on the previously generated agent public key. As used herein, each successive agent public key (e.g. second agent public key, third agent public key, fourth agent public key, or the like) is considered an updated agent public key.

The agent 106 may also include instructions for converting each agent public key into a key font. Fonts are styles that may be utilized when typing words of a document, program, etc. Example fonts include Times New Roman, Arial, Calibri, etc. Typically programs, will have a font file that includes a list of different fonts that may be utilized by an individual when providing input into the electronic device 100 through the user interface 118. Modern browsers (e.g. software programs that allow the requesting and retrieving of webpages) have sandboxing features to restrict access to system resources. Also there are no application programing interface (API) in a browser that will detect all available fonts on a system due to privacy concerns (e.g. anti-fingerprinting). So an individual attempting to hack, or behave nefariously is unable to extract a list of an installed font via a browser. The agent 106 includes instructions to generate the key font from the existing agent public key (e.g. first agent public key, second agent public key, third agent public key, etc.) and place the key font in a font file that may be installed, or provided to the operating system 110 of the electronic device.

In one example, in the code, the font is listed as 'Arial', 'Arial Black', 'Bahnschrift', 'Calibri', 'Cambria', 'Cambria Math', 'Candara', 'Comic Sans MS', L2cd8548ff41be686eddb4d411d0176184b1c718ce77113b3baa4e84fde6bb185' . . . where L2cd8548ff41be686eddb4d411d0176184b1c718ce77113b3baa4e84fde6bb185' is the key font generated from, and based on the agent public key. In this manner, the key font is communicated to the operating system 110 via the font file instead of a different manner that may be susceptible to security attacks via a browser. Instead, the key font is provided via a font file that is not allowed to be accessed by a browser, providing additional security for the system.

The application 108 may be any application, including a game, monitor, service, device locator, information provider, or the like. In one example the application is a PWA that may be installed, downloaded, uploaded, or the like onto or into the electronic device. The application 108 may include an icon utilized for accessing the application. The application is configured to identify the key font at the operating system and obtain the key font. The application is also configured to extract data, information, or the like from the key based on the agent key. In one example, the application 108 includes an application public key that is a shared key with the agent key.

The application 108 may also form or generate a key message that is communicated along the bus 104 to the agent 106 to provide a secure communication pathway between the agent 106 and the application 108 via the bus 104. In order to form or generate the key message, the application inquiries and communicates with the operating system by searching the font file of the operating system for a key font. The key font may be identified by any way, including through use of a shared key, lookup table, based on a number of characters, word recognition technology and circuitry not recognizing the existence of a word, or the like to identify the key font. The key font can then be communicated to the application 108 from the operating system 110, where the application 108 generates the key message. In one example, the agent public key is extracted from the key font and utilized with an application key to encrypt and form the key message. The key message may then be communicated over the bus 104 to the agent 106, where the agent can decrypt the key message with the agent public key and public application key. Upon decryption, a secure pathway across the bus 104 between the application 108 and agent 106 is provided so that the agent can response to the key message based on the key message.

Figure 2:
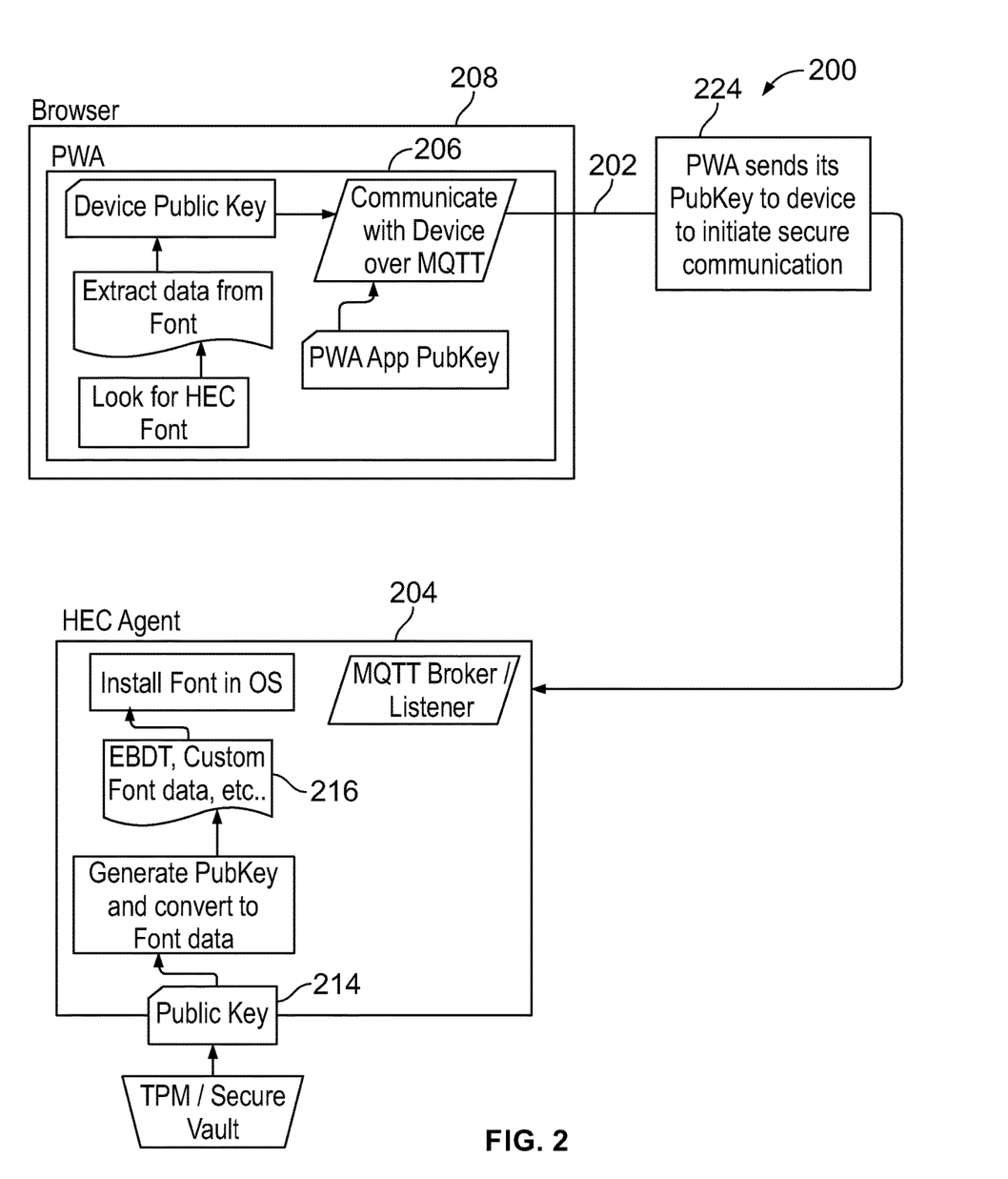
FIG. 2 illustrates a schematic block diagram of portion of the system of FIG. 1 in accordance with embodiments herein.
Figure 3:
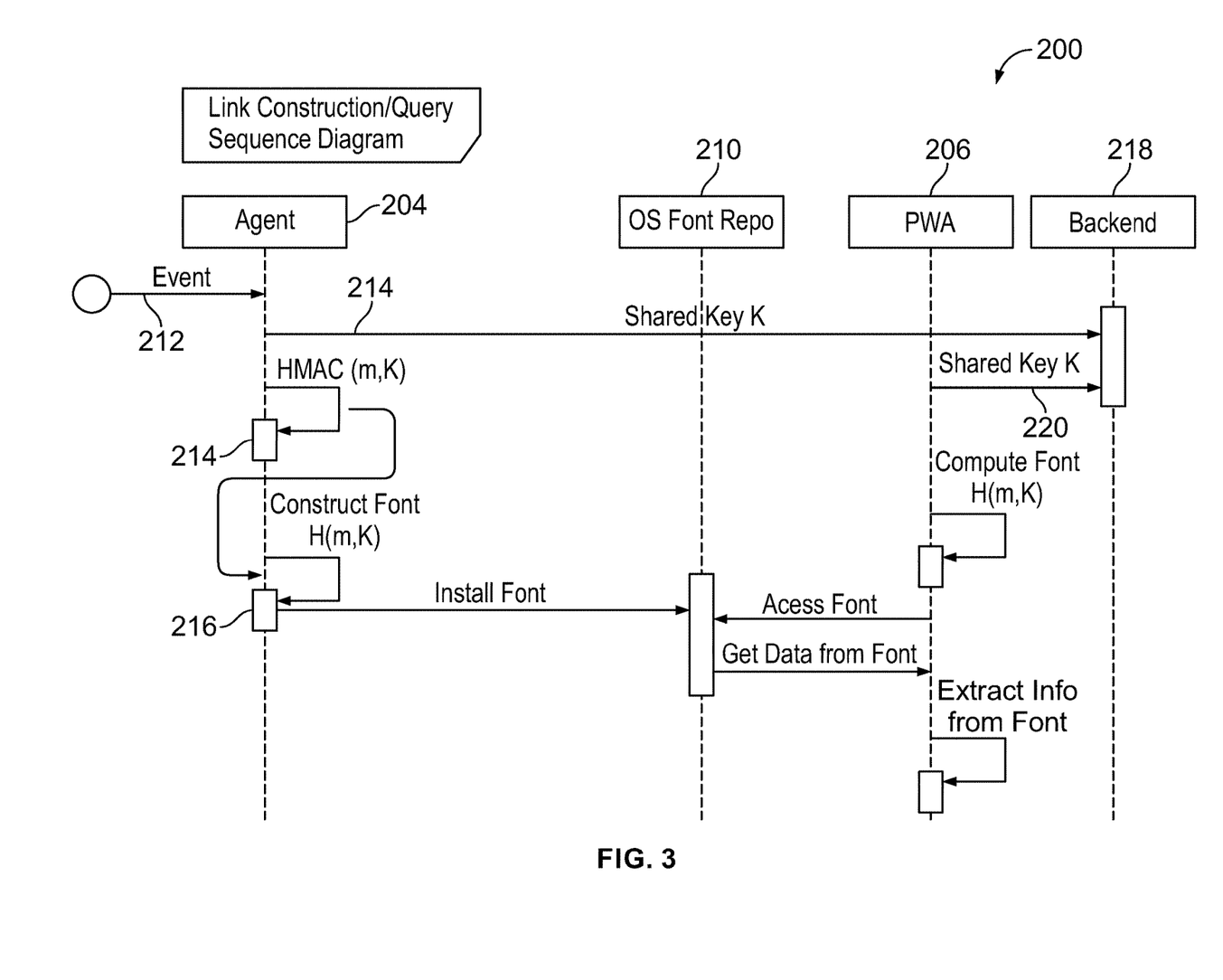
FIG. 3 illustrates a functional diagram of portions of the system of FIG. 1 in accordance with embodiments herein.
Figure 4:
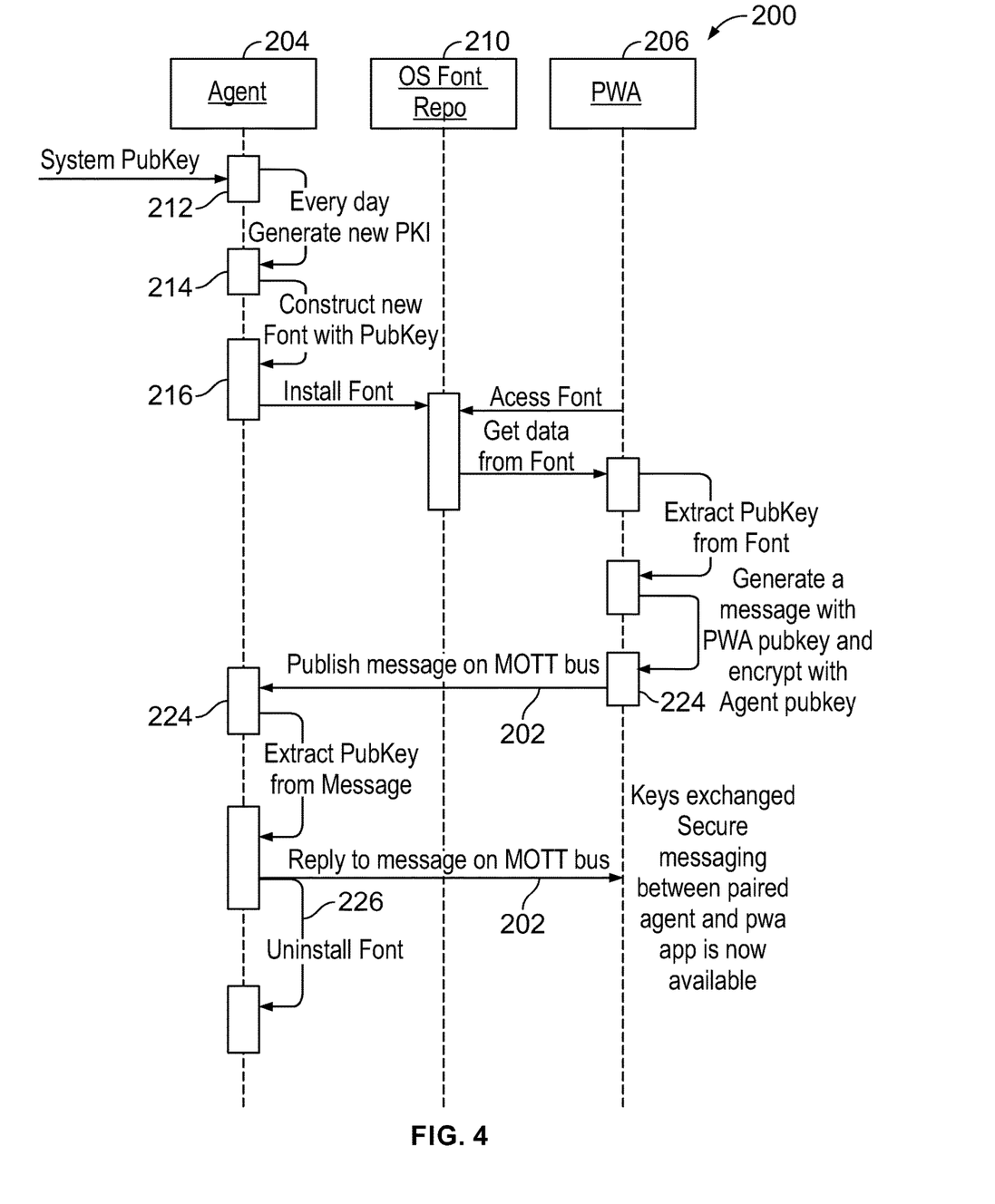
FIG. 4 illustrates a functional diagram of portions of the system of FIG. 1 in accordance with embodiments herein.

FIGS. 2-4 illustrate a functional diagram and schematic diagrams of portions of the system of FIG. 1 as well as examples of certain data, information, and content conveyed in accordance with embodiments herein. In particular, in the example embodiments of FIGS. 2-4, a system 200 is provided for an electronic device that can generate a secure communication pathway along a bus 202 between an agent 204 and an application 206 on a browser 208 by utilizing an operating system 210. The agent 204 may be circuitry, a program, or the like that communicates with the application that in one example is a PWA. The bus 202 in an example may be a MQTT bus for providing a high latency low bandwidth pathway for communicating data, information, bytes, or the like.

An event 212 may occur that results in the agent 204 generating an agent public key 214. In one example, the agent 204 is a security program, and the event may be the installation of the agent 204 on the electronic device, the providing of a public key to the agent by an operator, the communication of a public key to the agent, or the like. The agent public key 214 may be a combination of letters, numbers, hash functions, symbols, etc. that may be utilized to generate a key font 216 that is provided in a font file with a list of fonts. The agent public key 214 may also be communicated to a backend 218 of the electronic device. A backend 218 in one example is a server, while in another example the backend may be a system or circuitry that may verify content of an application, browser, webpage, or the like. Meanwhile, the application 206 may provide an application key 220 to the backend 218. In one example, the agent public key 214 and application key 220 may be a shared key utilized to share data between the application 206 and agent 204. In this manner, the application 206 may compute the key font 216 to utilize to search for the key font 216 in a font file at the operating system 210. The key font 216 is communicated from the agent 204 to the operating system 210. In one example, the agent installs a font file and accompanying key font 216 into the operating system 210 where the application 206 may search for the key font 216 based on computing or determining the key font 216 from the shared key.

Once the application has the key font 216, information, data, or the like may be extracted from the key font 216. This information, data, or the like may then by utilized with the application key to generate or form a key message 224. In one example, the key message 224 is encrypted with the agent public key 214 obtained from the key font 216 and the application key 220 to be communicated across the bus 202. The application key 220 may then be extracted from the key message 224 by the agent 204. As a result of receiving the key message 224 via the bus 202, the bus 202 is verified as a safe communication pathway. Consequently, in response to receiving the key message 224, a response to the key message 224 is communicated based on the key message 224. In addition, in response to communicating the key message 224 the key font 216 may be uninstalled 226 such that the font file no longer includes the key font 216. Instead to again access the secure pathway across the bus 202 an updated agent public key must be utilized to generate an updated key font, and updated key message.

In one example, to provide additional security, the agent generates an updated agent public key after a determined period. In one example, the determined period is one day such that after a day, an updated agent public key is provided. In another example, the determine period is immediately after the font file with the key font is uninstalled. By generating a new agent public key repeatedly after a determined period, a hacker only has the determined period to attempt to determine the agent public key and obtain access to the bus. Once the updated agent public key is generated, the updated agent public key is converted into an updated key font that may be communicated or installed into the operating system 210. Consequently, the application obtains the updated key font to extract and form an updated key message that can be communicated along the bus 202 back to the agent 204. A response can then be provided over the bus 202 based on receiving the updated key message. The updated font file and updated key font can then be uninstalled to prepare the agent for the next updated agent public key. The agent public key can then be repeatedly updated after each determined period so that the agent public key, key font, and key message are continuously updated to enhance security.

Figure 5:
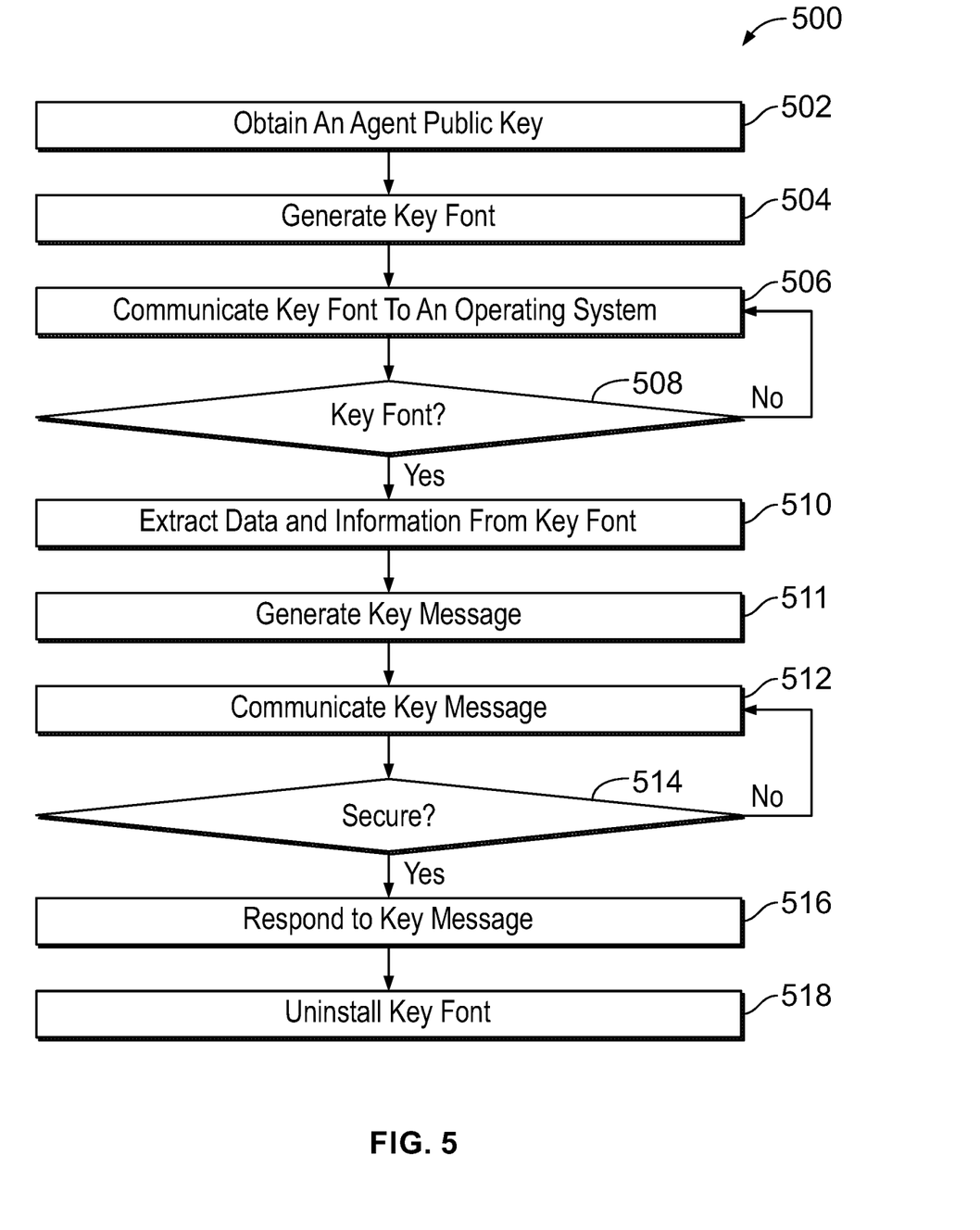
FIG. 5 illustrates a flow block diagram of an exemplary processes for securing a communication pathway in accordance with embodiments herein.

FIG. 5 illustrates a process 500 for securing a communication pathway, or bus between an agent of an electronic device and an application installed on the electronic device. In one example, the system of FIG. 1 and/or the system of the functional diagrams of FIGS. 2-4 are utilized to implement the process 500 of FIG. 5. To this end, the process may be implemented by one or more processors of an electronic device by executing instructions stored in a memory, including at least some instructions related to or associated with an agent.

At 502, one or more processors of an electronic device obtain an agent public key associated with a shared secret. In one example, a user inputs a public key via a communications interface, input device, or the like that is utilized to generate the agent public key. In one example, the public key is the agent public key. The communication interface can include a USB port, wired connection, wireless connection, communications port, or the like. The input device in example embodiments can include a touch screen, keyboard, mouse, voice activated controller, etc.

At 504, the one or more processors generate a key font from the agent public key. The key font may be placed in a font file in a list of fonts such a Times New Roman, Century, Arial, or the like. At 506, the one or more processors communicate the font file, including the key font to the operating system of the electronic device. In one example, the font file is installed into the operating system.

At 508, a determination is made by the application regarding whether a key font is provided in a font file of the operating system. If a key font is not identified by the application, the application continues looking for the key font in a font file of the operating system. The determination may be made based on the agent public key, an application public key, a shared key, the length of the key font, the characters of the key font, or the like. In each instance, a key font may be identified by the application. If the key font is identified, then at 510 data, information, etc. is extracted from the key font by the application. The data, information, etc. may be extracted based on a public key, the agent public key, an application key, a shared key, or the like.

At 511, the application generates a key message based on the data, information, etc. extracted from the key font. In one example, the key message can be encrypted with the data, information, an agent public key, an application public key, a shared key, or the like. At 512, the application communicates the key message along the bus. In one example the bus is a MQTT bus. In another example, another bus may be utilized.

At 514, the one or more processors determine if the communication received that includes the key message is secure. In one example, based on the agent public key, the key message that may also include encrypted data, information, or the like is decrypted to verify the key message was formed as a result of the key font. If a determination cannot be made whether the communication includes the key message, no reply or further communication is made between the agent and the application. However, if at 514, a determination is made that the key message was generated based on the key font, at 516 the one or more processors provide a response along the bus. In this manner, a secure communication pathway is verified.

At 518, the one or more processors uninstall the key font. In particular, the key font is eliminated so that the one or more processors may generate a new agent public key after a determined period. The updated agent public key can then be utilized to generate an updated key font used to generate an updated key message that is utilized to provide an updated response along the secure bus. In this manner, the process may be continuously repeated so that the agent public key only exists for a determined period of time. This results in a hacker only having a limited time to attempt to determine an agent public key, a key font, a key message, or the like before an updated version is provided.

Closing Statements

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method, or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices, and program products according to various example embodiments. These program instructions may be provided to a processor of a general-purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting, and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming.

The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "associated with one or more of the client device and a user of the client device" means and shall encompass i) "associated with the client device", ii) "associated with a user of the client device" and/or iii) "associated with both the client device and a user of the client device". For the avoidance of doubt, the claim limitation "one or more of touch, proximity sensing, gesture or computer vision" means and shall encompass i) "touch", ii) "proximity", (iii) "sensing", (iv) "gesture", and/or (iv) "computer vision" and any sub-combination thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
   a memory storing program instructions;
   one or more processors that, when executing the program instructions, are configured to:
   (a) generate an agent public key;
   (b) generate a key font based on the agent public key;
   (c) communicate the key font to an operating system;
   (d) obtain a key message based on the key font from an application; and
   (e) respond to the key message on a bus based on the key message.

2. The electronic device of claim 1, the one or more processors also configured to:
   (f) generate an updated agent public key after a determined period;
   (g) generate an updated key font based on the updated public key;
   (h) obtain an updated key message based on the updated key font from the application;
   (i) respond to the updated key message on the bus based on the updated key message; and
   (j) repeat steps (f)-(i).

3. The electronic device of claim 1, the one or more processors also configured to uninstall the key font in response to responding to the key message on the bus.

4. The electronic device of claim 1, wherein the application is a progressive web application.

5. The electronic device of claim 1, wherein the bus is a message queuing telemetry transport (MQTT) bus.

6. The electronic device of claim 1, further comprising the application, and wherein the application is configured to:
   receive the key font from the operating system;
   generate the key message; and
   communicate the key message over the bus.

7. The electronic device of claim 6, wherein to generate the key message includes encrypting the key message based on the agent public key and an application public key.

8. The electronic device of claim 1, further comprising the operating system, wherein the operating system is configured to receive the key font and communicate the key font to the application.

9. A computer implemented method for providing a secure communication path comprising:
   under control of one or more processors including program instructions to:
   (a) generate an agent public key;
   (b) generate a key font based on the agent public key;
   (c) communicate the key font to an operating system;
   (d) obtain a key message based on the key font from an application; and
   (e) respond to the key message on a bus based on the key message.

10. The method of claim 9, the one or more processors also including program instructions to:
(f) generate an updated agent public key after a determined period;
(g) generate an updated key font based on the updated public key;
(h) obtain an updated key message based on the updated key font from the application;
(i) respond to the updated key message on the bus based on the updated key message; and
(j) repeat steps (f)-(i).

11. The method of claim 9, the one or more processors also including program instructions to uninstall the key font in response to responding to the key message on the bus.

12. The method of claim 9, wherein the application is a progressive web application.

13. The method of claim 9, wherein the bus is a message queuing telemetry transport (MQTT) bus.

14. An electronic device comprising:
a memory storing program instructions;
one or more processors that, when executing the program instructions, are configured to:
generate a first key font based on a first agent public key;
an operating system configured to receive the first key font and communicate the first key font to an application;
the one or more processors also configured to:
obtain a first key message based on the first key font from the application; and
respond to the first key message on a bus based on the first key message.

15. The electronic device of claim 14, wherein the application is a progressive web application.

16. The electronic device of claim 14, wherein the bus is a message queuing telemetry transport (MQTT) bus.

17. The electronic device of claim 14, wherein the one or more processors are also configured to uninstall the key font in response to responding to the key message on the bus.

18. The electronic device of claim 14, further comprising the application, and wherein the application is configured to:
receive the key font from the operating system;
generate the key message based on the key font; and
communicate the key message over the bus.

19. The electronic device of claim 18, wherein to generate the key message includes encrypting the key message based on the agent public key and an application public key.

20. The electronic device of claim 14, the one or more processors also configured to:
in response to a determined period lapsing after generating the first agent public key, generate a second agent public key; and generate a second key font based on the second agent public key;
the operating system also configured to receive the second key font and communicate the second key font to an application;
the one or more processors also configured to:
obtain a second key message based on the second key font from the application; and
respond to the second key message on the bus based on the second key message.

* * * * *